United States Patent [19]

Abraham et al.

[11] 3,764,912

[45] Oct. 9, 1973

[54] MULTIPLE CONTROL POINT SWITCHING SYSTEM HAVING AUTOMATIC ACCESS

[75] Inventors: Richard H. Abraham, Waukegan; Rolf E. Kowalewski, Palatine, both of Ill.

[73] Assignee: Motorola Inc., Franklin Park, Ill.

[22] Filed: Sept. 7, 1972

[21] Appl. No.: 287,128

[52] U.S. Cl. .......................... 325/22, 325/31, 325/64, 307/247, 328/195, 328/206, 331/55, 331/145

[51] Int. Cl. ............................................ H04b 1/44

[58] Field of Search .................... 325/22, 31, 15–21, 325/51, 55, 57, 64; 307/247, 272, 291; 328/191, 195, 206; 331/46, 50, 52, 55, 144, 145

[56] References Cited

UNITED STATES PATENTS 3,161,728 12/1964 Rose et al. ............................ 325/55

*Primary Examiner*—Albert J. Mayer
*Attorney*—Vincent Rauner et al.

[57] ABSTRACT

A channel switching circuit for a two-way radio system employing a multivibrator to provide automatic reversion to a preselected channel when the microphone or handset is hung up. Means are provided to allow channel selection from remote units which provide automatic access to the channel switching circuitry.

11 Claims, 1 Drawing Figure

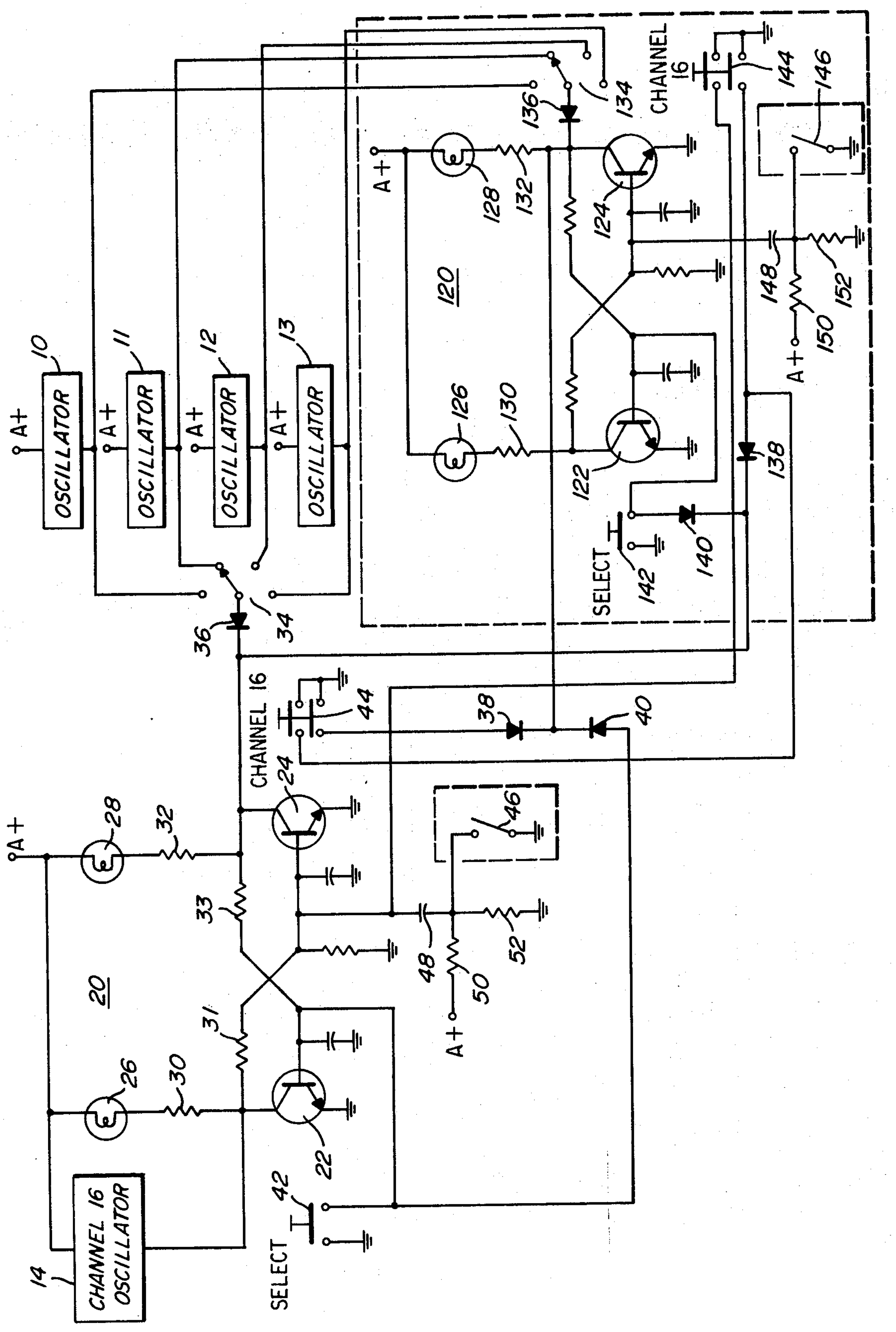
OSCILLATOR
OSCILLATOR
OSCILLATOR
OSCILLATOR
CHANNEL 16 OSCILLATOR
CHANNEL 16
CHANNEL 16
SELECT
SELECT
A+

MULTIPLE CONTROL POINT SWITCHING SYSTEM HAVING AUTOMATIC ACCESS

BACKGROUND

1. Field of Invention

This invention relates generally to channel selecting systems, and more particularly to channel selecting systems for two-way radios.

There are many applications wherein it is necessary to provide a channel selecting system having remote control capability and automatic monitoring of a predetermined channel when the system is in a standby mode. One such application for such a system is in a marine band radio transceiver wherein it is required by Federal Communications Commission rules that the safety and distress calling channel, channel 16, be monitored at all times that the radio is in operation. Other applications are in special fixed and mobile radio systems.

2. Prior Art

Channel selecting systems of the prior art require that the emergency channel be selected manually. Remote control capability is usually provided by transferring all control functions by means of a relay or function transfer switch.

Whereas the prior art systems provide a way to achieve emergency channel monitoring and remote control, the channel monitoring is not automatic, and the remote control units do not have automatic access, but require that the control functions be manually transferred to the desired remote control unit.

SUMMARY

It is an object of the present invention to provide a channel selecting system for a radio transceiver that has automatic reversion to a predetermined channel.

It is a further object of this invention to provide a channel selecting system having remote control capability with automatic access.

It is another object of this invention to provide a channel selecting system having multiple control point remote operation while maintaining the simplicity of operation of a single point control system.

Still another object of the invention is to provide a simplified and lower cost multiple control point remote control system for a radio transceiver.

In accordance with a preferred embodiment of the invention, a bistable multivibrator is used to selectively energize a predetermined local oscillator to select the predetermined channel. A switch, mounted on the microphone hang up box or handset cradle, is connected to the multivibrator and causes the multivibrator to revert to a preselected channel whenever the microphone or handset is hung up. Full remote control capability is provided by employing another multivibrator for each remote control point. The multivibrators are interconnected so that each remote control unit provides full control of the radio and automatically disables the other control units when the radio is being controlled therefrom.

DESCRIPTION OF THE DRAWING

The single drawing is a schematic diagram of the channel selecting system according to the invention and shows a master control unit and a remote control unit.

DETAILED DESCRIPTION

Referring to the drawing, a group of oscillators 10 through 13 and a channel 16 or emergency frequency oscillator 14 are connected to a master bistable multivibrator 20 and a remote bistable multivibrator 120 through switches 34 and 134 and diodes 36 and 136, respectively. The aforementioned oscillators may be local oscillators for a superheterodyne receiver, or reference oscillators for a radio transmitter, and are used to determine the transmitting or receiving frequency of the radio. The master multivibrator comprises transistors 22 and 24 and associated components. Indicator lamps 26 and 28 are connected to the collectors of transistors 22 and 24 through resistors 30 and 32, respectively. Similarly, the remote multivibrator comprises transistors 122 and 124 and associated components, and indicator lamps 126 and 128 are connected to the collectors of transistors 122 and 124 through resistors 130 and 132, respectively. The collector of transistor 124 is connected to the bases of transistors 22 and 24 through diodes 38 and 40, while the collector of transistor 24 is connected to the bases of transistors 122 and 124 through diodes 140 and 138, respectively. Switches 42, 44, 142 and 144 connect the bases of transistors 22, 24, 122 and 124 to ground, respectively. Switches 44 and 144 are double pole switches connected so that the bases of both of the transistors 24 and 124 are grounded when either switch is closed. Similarly, switches 46 and 146 provide a ground return for capacitors 48 and 148, respectively, the aforesaid capacitors also being connected to the bases of transistors 24 and 124. Resistors 50 and 52, and resistors 150 and 152 are connected between the power supply A+ and ground to form a voltage divider for supplying a bias potential to capacitors 48 and 148, respectively.

In operation, the bistable multivibrator 20, which is the master multivibrator in this embodiment, supplies a ground return path for the oscillator 14 or for one of the oscillators 10–13. The switches 42 and 44, which are of the momentary contact type, are used to cause the multivibrator 20 to change state. When the switch 44 is closed, the base of the transistor 24 is brought to ground potential, thereby rendering transistor 24 nonconductive. When transistor 24 is rendered nonconductive, the voltage appearing at the collector thereof is applied to the base of transistor 22 through a cross coupling resistor 33, thereby rendering transistor 22 conductive. The conduction of transistor 22 allows current to flow from the power supply A+ through the oscillator 14 to ground, thereby energizing the oscillator 14. Simultaneously, current flows from the power supply A+ through the indicator lamp 26 and resistor 30 and causes the lamp 26 to light to indicate that the oscillator 14 has been energized. Since the transistor 22 is conductive, the collector thereof is at substantially ground potential, and this voltage is applied through another cross coupling resistor 31 to the base of transistor 24, thereby maintaining the transistor 24 nonconductive after the momentary contact switch 44 is allowed to open. In a similar fashion, momentarily closing the switch 42 applies ground potential to the base of transistor 22, thereby rendering transistor 22 nonconductive and transistor 24 conductive. The conduction of transistor 24 completes the energizing circuit for one of the oscillators 10–13, any one of which may be selectively energized by setting the switch 34 to an appropriate position. The indicator lamp 28 lights when transistor 24 is rendered conductive to indicate that one of the oscillators 10 through 13 has been energized.

The circuit of the instant invention is usable in a marine band radio transceiver, wherein it is required by FCC rules that an emergency channel (channel 16) be monitored whenever the radio is in operation. In this application, the frequency of the oscillator 14 is selected so that the emergency channel 16 is received. The other oscillators 10 through 13 have operating frequencies that can be chosen by the user to enable him to receive other desired signals.

Automatic monitoring of the emergency channel 16 is provided by the circuit including capacitor 48, resistors 50, 52 and switch 46. Since most radio transceivers employ a microphone or a handset for transmitting voice messages, the switch 46 can be located in a hang up box for the microphone or in the cradle for the handset. The switch 46 is closed when the cradle or handset is hung up, and open when the microphone or handset is off the hook or in use. In the latter case, a bias voltage is applied to one plate of the capacitor 48 from the voltage divider including resistors 50 and 52. When the microphone or handset is hung up, the voltage at the junction of resistors 50 and 52 is brought to ground potential, and the resultant voltage drop is transferred through the capacitor 48 to the base of the transistor 24 to turn off transistor 24 and to energize the oscillator 14, thereby assuring that the emergency channel 16 is automatically selected following each transmission on another channel.

It is also desirable in many applications to provide a remote control station for controlling the radio and selecting the frequency of operation thereof. This is accomplished in the instant invention through the use of the multivibrator 120, which is similar to multivibrator 20, and associated circuitry. The transistor 124 energizes one of the oscillators 10–13 by supplying a ground connection thereto through the switch 134, the diode 136 and the transistor 124 when said transistor is conductive. The diodes 36 and 136 isolate multivibrators 20 and 120 from each other. The transistor 124 is rendered conductive when the switch 142 is momentarily closed. The operation of the switch 142 is analogous to the operation of the switch 42 connected to the multivibrator 20. The transistor 124 is rendered nonconductive when the switch 144 is momentarily closed. The switches 44 and 144 are double pole switches, each having one pole connected to the base of transistor 24 and the other to the base of transistor 124. Hence, depressing either of the switches 44 or 144 renders transistors 24 and 124 nonconductive, and transistors 22 and 122 conductive, thereby energizing the oscillator 14 and the indicator lights 26 and 126 to allow the emergency channel to be selected from either control unit.

One of the other oscillators 10–13 can be selected by means of either switch 42 or 142, however care must be taken to prevent two of the aforementioned oscillators from being energized. This is accomplished by the cross coupling circuitry comprising the diodes 38, 40, 138 and 140. In the event that one of the oscillators 10–13 is energized by momentarily closing the switch 42 to render the transistor 24 conductive, the voltage appearing at the collector of transistor 24, which is substantially at ground potential, is applied to the bases of transistors 122 and 124 through the diodes 138 and 140 to render both transistors 122 and 124 nonconductive, thereby preventing another of the oscillators 10–13 from being energized by the multivibrator 120. Similarly, if the transistor 124 is rendered conductive to energize one of the oscillators 10–13, the reduced voltage appearing at the collector of the transistor 124 is coupled to the bases of transistors 22 and 24 through the diodes 38 and 40 to prevent the oscillators 10 through 13 from being simultaneously energized by the multivibrator 20.

The aforementioned cross coupling allows any of the oscillators 10–14 to be energized from either the master or the remote control unit automatically without the need for a control transferring switch or relay as is normally required to transfer control from the master unit to the remote unit. The automatic access feature allows automatic reversion circuitry to be used in the remote unit to automatically select the emergency channel 16 when a microphone or handset connected to the remote unit is hung up. The automatic reversion feature for the remote unit is provided, in this embodiment, by means of the capacitor 148, resistors 150, 152 and hook switch 146, which are analogous in structure and in operation to the capacitor 48, the resistors 50, 52 and the switch 46 of the master unit 20.

I claim:

1. A switching circuit having a plurality of control stations including in combination:

first bistable means having first and second stable states, a first output terminal and first and second control terminals;

means for setting said first bistable means to a selected one of said first and second stable states connected to the control terminals thereof;

second bistable means having first and second stable states, at least one output terminal and first and second control terminals;

means coupling said output terminal of said second bistable means to said control terminals of said first bistable means;

means coupling said output terminal of said first bistable means to said control terminals of said second bistable means;

means for setting said second bistable means to a selected one of said first and second stable states connected to the control terminals thereof;

means connecting said first and second bistable setting means for enabling both bistable means to be set to said first stable state by one of said bistable setting means; and means coupling said output terminals of said first and second bistable means to controllable means for providing energizing signals thereto;

whereby energizing signals are selectively applied to said controllable means from one of said first and second bistable means in accordance with the stable states thereof.

2. A switching circuit as recited in claim 1 wherein one of said bistable means includes a second output terminal and has second controllable means connected thereto to receive energizing signals therefrom.

3. A switching circuit as recited in claim 2 wherein said controllable means and said second controllable means include oscillators.

4. A switching circuit as recited in claim 3 wherein said means for setting said first and second bistable means each include switches connected to said control terminals for changing the state of said bistable means and channel selecting switches connecting said first output terminal and said first controllable means for changing the oscillation frequency thereof.

5. A switching circuit as recited in claim 4 wherein said switching system is used in conjunction with a radio transceiver having a microphone and hang up means therefor, and wherein said setting means each includes switch means attached to said hang up means for switching said bistable means to said first predetermined state for energizing said second controllable means when said microphone is hung up, thereby enabling said transceiver to receive a predetermined frequency signal.

6. A switching circuit as recited in claim 5 wherein said second bistable setting means is located at a separate control point remotely separated from said first bistable setting means, and wherein said second control point includes microphone hang up means and switch means for setting said second bistable means to said first predetermined state attached thereto.

7. A switching circuit having a plurality of control stations including in combination:

first bistable means having first and second stable states, an output terminal and first and second transistors each having an input terminal for setting said bistable means to one of said stable states;

first switch means for causing said first bistable means to change state connected to said input terminals;

second bistable means having first and second stable states, an output terminal and first and second transistors each having an input terminal for setting said bistable means to one of the stable states thereof;

means coupling said output terminal of said second bistable means to the input terminals of said first and second transistors of said first bistable means;

means coupling said output terminal of said first bistable means to said input terminals of said first and second transistors of said second bistable means;

second switch means for causing said second bistable means to change state connected to said input terminals of said first and second transistors of said second bistable means;

means connecting said first and second switch means for enabling both bistable means to be set to the first stable state by one of said bistable setting means; and means coupling said output terminals of said first and second bistable means to controllable means for providing energizing signals thereto;

whereby energizing signals are selectively applied to said controllable means from one of said first and second bistable means in accordance with the stable states thereof.

8. A switching circuit as recited in claim 7 wherein each of said switch means includes a first momentary contact switch connected to said first input terminal and a second momentary contact switch connected to said second input terminal.

9. A switching circuit as recited in claim 8 wherein each of said switch means includes a third switch having an open and a closed position and means for applying a signal indicative of a change in the position of said switch connecting said switch and said first input terminal.

10. A switching circuit as recited in claim 8 wherein each of said first switches is further connected to said first input terminal of the other bistable means.

11. A switching circuit as recited in claim 10 wherein each of said coupling means includes a diode pair coupling said input terminals of one of said bistable means to the output terminal of the other of said bistable means.

* * * * *

UNITED STATES PATENT OFFICE

CERTIFICATE OF CORRECTION

Patent No. 3,764,912 Dated October 9, 1973

Inventor(s) Richard H. Abraham et al.

It is certified that error appears in the above-identified patent and that said Letters Patent are hereby corrected as shown below:

In the drawings place connection dots at the junction of the following lines to show interconnection of said lines:

A) a line extending from the junction of capacitor 48 and the base of transistor 24 to switch 144; and a line extending from switch 44 to the junction of diode 138 and switch 144.

B) a line extending from the base of transistor 124 to capacitor 148; and a line extending from switch 144 to diode 138.

Signed and sealed this 10th day of December 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
U.S. GOVERNMENT PRINTING OFFICE 869-930